Sept. 22, 1931.  A. G. STEINMAYER  1,823,959
TOOL FOR SHAPING THE ENDS OF CONDUITS
Filed Aug. 24, 1929   3 Sheets-Sheet 1
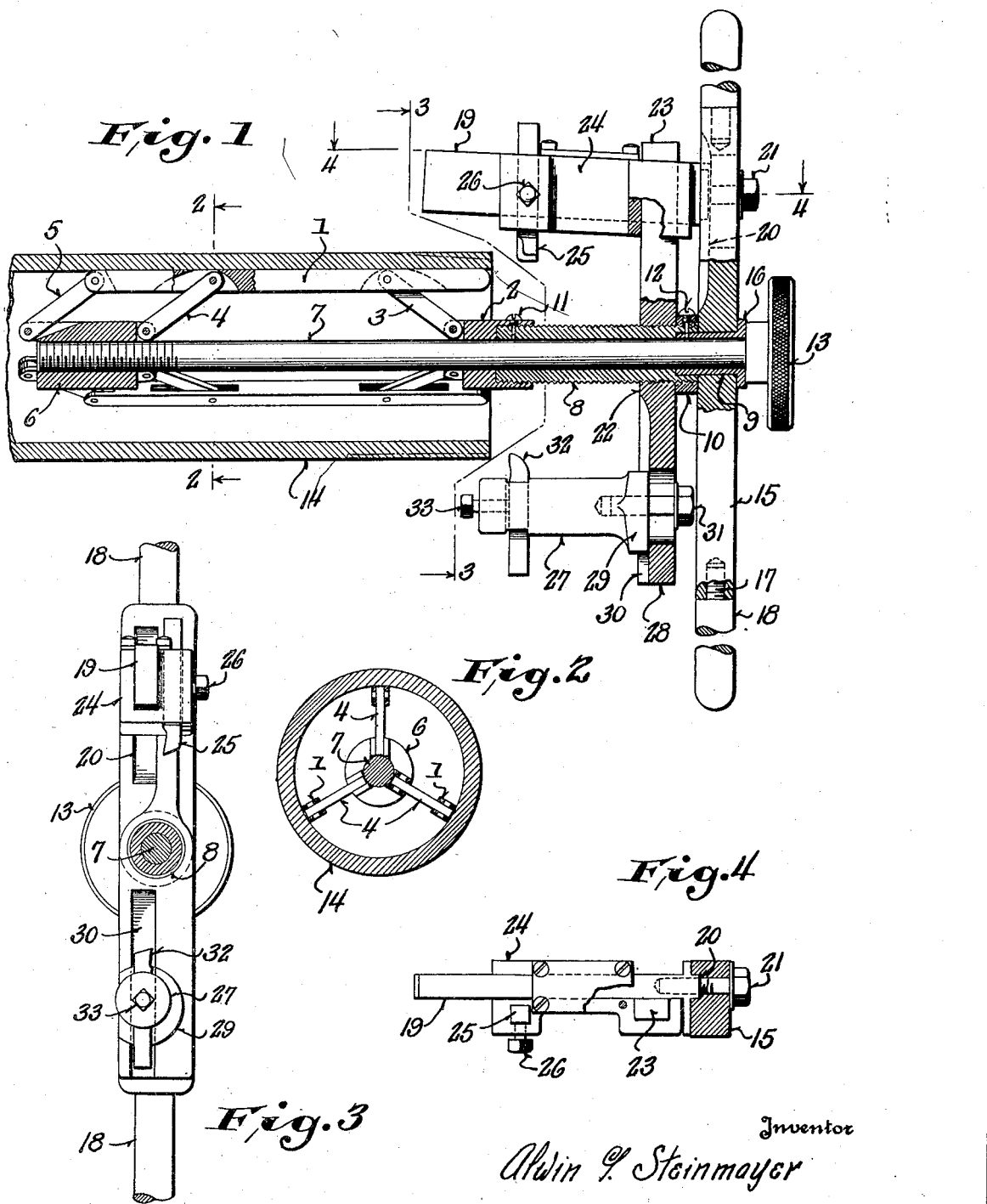
Inventor
Alwin G. Steinmayer
By Arthur R. Woolfolk
Attorney

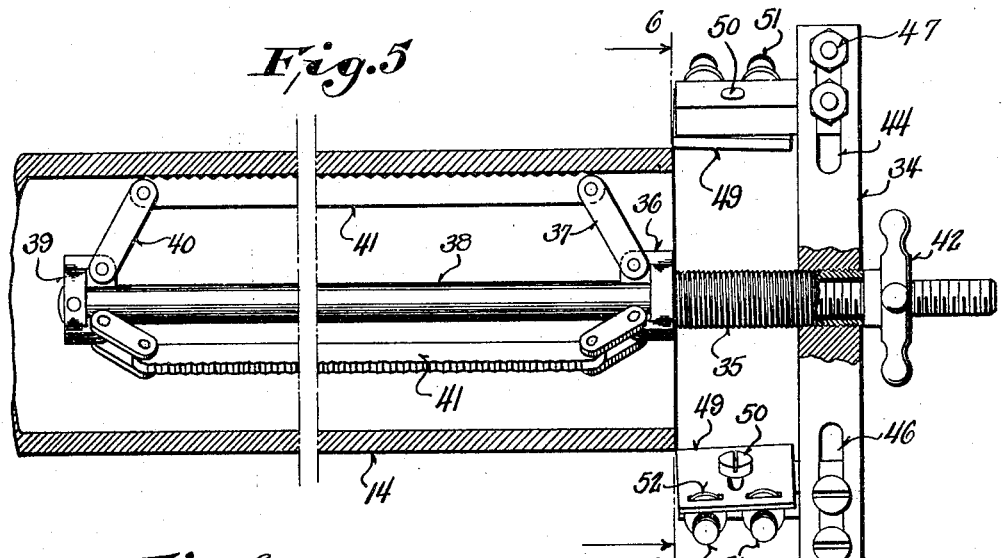
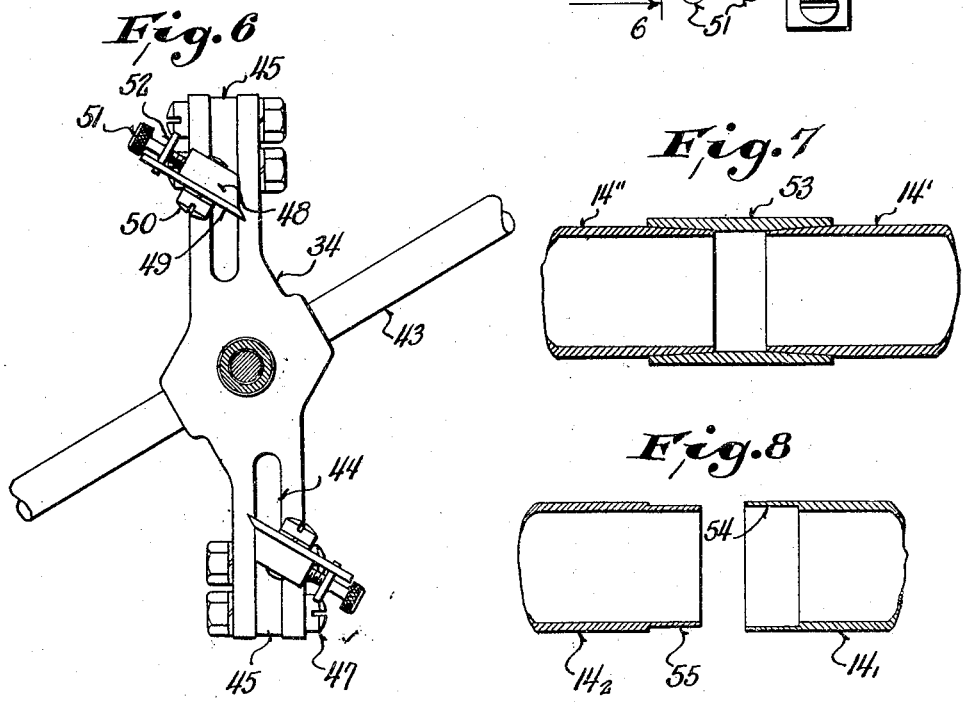

Sept. 22, 1931.    A. G. STEINMAYER    1,823,959
TOOL FOR SHAPING THE ENDS OF CONDUITS
Filed Aug. 24, 1929    3 Sheets-Sheet 3
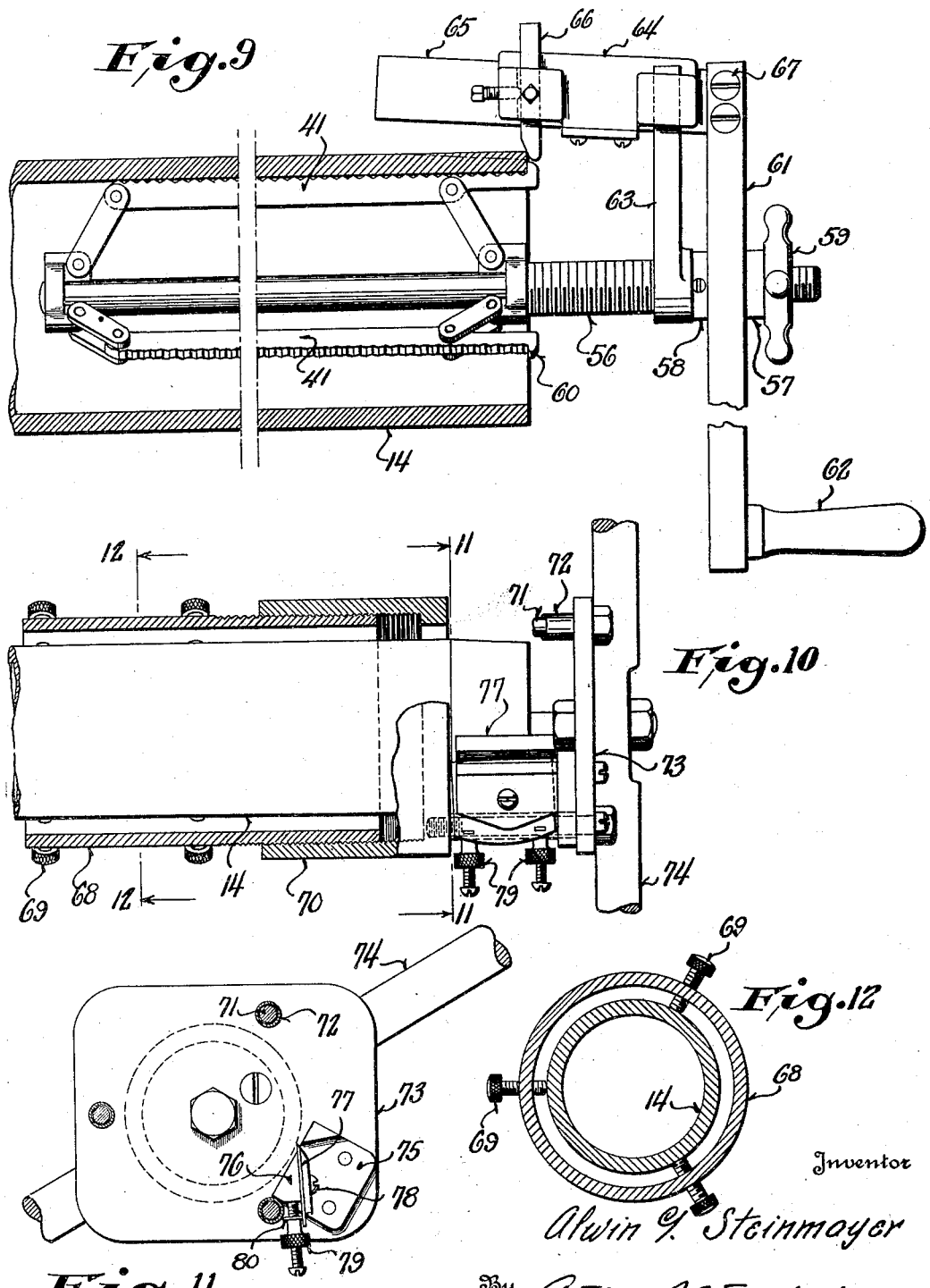

Patented Sept. 22, 1931

1,823,959

UNITED STATES PATENT OFFICE

ALWIN G. STEINMAYER, OF MILWAUKEE, WISCONSIN, ASSIGNOR TO LINE MATERIAL COMPANY, OF SOUTH MILWAUKEE, WISCONSIN, A CORPORATION OF DELAWARE

TOOL FOR SHAPING THE ENDS OF CONDUITS

Application filed August 24, 1929. Serial No. 388,142.

This invention relates to tools for shaping the ends of conduits and is particularly directed to tools for shaping the ends of conduits composed of fibre, asphalt paper, treated wood, or other materials.

When conduits are shipped from the factory they are generally provided with some means for joining the ends of successive lengths. The means most commonly employed is that known as the Harrington joint, which consists of a tapered sleeve joining two tapered ends, although other types of joints are sometimes used as, for instance, the socket joint.

In laying conduits in trenches, it is often necessary to cut the conduits to fit in a certain spacing, or to secure staggered joints where a group of conduits are used.

In the past, the common practice has been to use an axe or draw knife to taper the ends, but the resulting joint was far from satisfactory and frequently some of the conduit was spoiled or wasted. In addition to this, the trimming operation when performed by hand took a good deal of time and required a high degree of skill to secure even a rough approximation of a good joint.

This invention is designed to overcome the difficulties noted above, and objects of this invention are to provide a tool for shaping the ends of conduits which is so constructed that it may be used in the field, which will accurately shape the ends of conduits, which is easy to operate even by an unskilled laborer, and which produces a finished, accurately fitting end that may be slipped into a coupling sleeve, or the end of the next section, with the assurance that a substantially perfect joint will result.

Further objects are to provide a tool for shaping the ends of conduits which may be used to taper or otherwise shape the ends of fibre, asphalt paper, or treated wood conduits, or conduits of other materials without any chance of gumming up the cutting tool, with certainty that the tapered or otherwise shaped end will be in alignment with the outer line of the conduit, preferably with the axis of the interior opening through the conduit.

It is well known that conduits vary somewhat in their outside dimensions, even for a given size of bore, and that it is customary to provide conduits in different sizes.

Further objects are to provide a tool for shaping the ends of conduits which will operate upon conduits of different sizes and upon conduits whose outside contour is irregular and which will still produce an accurately tapered or shaped end.

Further objects are to provide a tool for shaping the ends of conduits which may be rigidly locked to the conduit, which has an automatic feed, which merely requires the operator to rotate it, means being provided whereby such operation may be readily performed, and which does not require an excessive effort of the operator.

In the preferred form of the invention, further objects are to provide a conduit end-shaping tool which automatically centers itself from the interior of the conduit and locks firmly to the interior surface of the conduit, which is provided with operating means for actuating the locking and centering means, and in which the locking means may be operated from a point outside the conduit and spaced therefrom and located in an easily accessible position.

In the preferred form of the invention, further objects are to provide a conduit shaping device having a narrow tool which gums up very little if at all, and in which the force exerted upon the tool in rotating it is great enough to keep the tool relatively clean.

Further objects are to provide a conduit end-shaping tool provided with a cutting tool which may be easily removed, sharpened, and repositioned and adjusted to the exact point desired, and which is preferably provided with a main tool for taking a finishing cut, and which may be provided with a second tool for taking a roughing cut so that there is no danger of excessive loading of the tools.

Further objects are to provide a conduit end-shaping tool in which the roughing and finishing tools are so carried by the device that the roughing tool may be set in advance of the finishing tool any desired extent, and in which the tools are independently adjustable and may be adjusted for any depth of cut.

Further objects are to provide a device having the characteristics enumerated above, which is freely portable, which does not require much room, which is very strong although of relatively light weight, which is simple and cheap to make, and which does not have any fragile or delicate parts which are difficult to produce or are easily broken in use.

Embodiments of the invention are shown in the accompanying drawings, in which:—

Figure 1 is a side elevation, partly in section, of the preferred form of the invention, showing the tool in place and ready to shape the end of the conduit.

Figure 2 is a sectional view on the line 2—2 of Figure 1.

Figure 3 is a sectional view on the line 3—3 of Figure 1.

Figure 4 is a sectional view on the line 4—4 of Figure 1.

Figure 5 is a view, partly in section, of a modified form of the invention.

Figure 6 is a sectional view on the line 6—6 of Figure 5.

Figure 7 is a sectional view through the joint at adjacent ends of a pair of conduits, showing a taper joint known as the Harrington joint.

Figure 8 is a view similar to Figure 7 showing a socket joint, the adjacent lengths of conduit being separated, or drawn apart.

Figure 9 is a view similar to Figure 1 showing a further form of the invention.

Figure 10 is a view, partly in section, showing a still further form of the invention.

Figure 11 is a sectional view on the line 11—11 of Figure 10.

Figure 12 is a sectional view on the line 12—12 of Figure 10.

The preferred form of the invention is shown in Figures 1 to 4. The machine comprises an expanding mandrel composed of three or more regularly spaced bars 1. These bars are joined to a stationary collar 2 by means of links 3. The bars 1 are also each provided with a pair of parallel links 4 and 5, which are pivotally carried by means of an end nut 6. This end nut is internally threaded, and is received upon the threaded end of an adjusting or clamping screw 7.

The links 3, 4, and 5 may be set into the bars 1 if desired, and single links thus employed. If, however, it is desired to use double links, they may be easily employed in place of single links, as will appear from the description hereinafter following of other forms of the invention.

The front or outer end of the device comprises a threaded sleeve 8 which is pinned or otherwise secured to the collar 2. This sleeve 8 receives a bushing 9 adjacent its front and a collar 10. The collar 10 is preferably threaded upon the sleeve 8, and both the collar 10 and the bushing 9 are pinned to the sleeve as shown in Figure 1. A convenient way of pinning the collar 2 and the collar 10 and bushing 9 is to provide a tapped hole just beyond the the end of the pin and insert a screw therein, as indicated at 11 and 12. This screw may have a reduced extension which constitutes the pin for locking the parts together, or, if desired, the pin may be separate and distinct from the screw.

An adjusting hand wheel 13 is rigidly carried by the shaft or rod 7, and is located outside of all of the mechanism, as shown in Figure 1, so that it is readily accessible and may be rotated to draw the nut 6 towards the collar 2. This causes the mandrel to expand and thus engage the inner surface of the conduit 14, the bars 1 binding tightly against the inner surface and the link mechanism centering the rod or shaft 7 axially of the conduit with reference to its interior bore. It is, therefore, apparent that although the exterior of the conduit may vary in diameter or may otherwise be irregular in contour, that nevertheless the rod or shaft 7 and, consequently, the sleeve 8 are centered with reference to the interior bore or opening through the conduit.

A driving head 15 is revolubly mounted upon the bushing 9, such head being located between a flange 16 integral with the bushing and the front face of the sleeve 8 and collar 10, as shown in Figure 1, so that tightening of the hand wheel 13 does not cause the driving head to bind. The driving head is provided with internally threaded holes at its ends into which the reduced threaded extensions 17 of operating handles 18 may be screwed. When the device is not in use, the handle is unscrewed so that the overall dimensions of the device are materially reduced, thus permitting the device to be stored in a relatively small space.

A slanting guide 19 in the form of a bar is adjustably carried by the driving head 15, and is adapted to project over the end of the conduit when the device is in place. Preferably the guide 19 has a rectangular inner end which fits within a radial slot 20 formed in the driving head 15, and is thus prevented from rocking or turning. The guide 19 is clamped in place by means of a bolt 21.

As stated, the guide 19 is preferably slanting, so that the device may be used to cut a taper on the end of the conduit. However, it is to be appreciated that when a socket joint is desired, either no taper at all is needed, or else only a very slight taper. This is very readily accomplished by providing a guide in place of the slanting guide 19 which extends rearwardly either parallel or substantially parallel to the rod or shaft 7.

An auxiliary head 22 is provided with an internally threaded opening which receives the threaded sleeve 8. This auxiliary head is, therefore, free to revolve upon the sleeve 8, and when rotated in the appropriate direction, for example, righthanded, it travels inwardly along the sleeve. The auxiliary head 22 is provided with a rectangular outwardly projecting arm 23 at one end, which is slidably received within a slide 24. This slide 24 embraces the guide 19 and is adapted to travel outwardly along such slide. The slide 24 adjustably carries a finishing tool 25, which is clamped in place by means of a bolt or set screw 26.

From the description thus far given it is apparent that as the driving head 15 is rotated by means of the handles 18, it revolves the guide 19 about the end of the conduit. Inasmuch as the auxiliary head is coupled to the slide 24 and thus to the guide 19, it is apparent that this auxiliary head is also rotated and travels inwardly along the threaded sleeve 8, thus moving the slide 24 along the guide 19 and causing the tool 25 to gradually and uniformly feed or travel along the work. However, it is preferable to provide for a roughing cut, so that the tool 25 may be employed merely to give a true finishing cut.

The roughing cut is easily obtained by mounting an adjustable post 27 upon an outwardly projecting arm 28 from a portion of the head 22. The post 27 is preferably provided with a rectangular base 29, which is received in a slot 30 formed in the arm 28. The post 27 is locked in adjusted position by means of the bolt 31. The outer end of the post is slotted and adjustably receives the roughing tool 32, which may be clamped in place by means of the bolt or set screw 33.

It is believed that the operation of the device is apparent from the description thus far given, but it may be briefly summarized as follows: When it is desired to taper or otherwise shape the end of a conduit, the expanding mandrel is slipped into the conduit and the hand wheel 13 rotated, thus causing the bars or arms 1 to engage the interior surface of the conduit, locking and centering the entire device with reference to this interior surface. Thereafter the driving head 15 is rotated, and the auxiliary head 22 is correspondingly rotated and fed towards the conduit. The roughing tool 32 makes a roughing cut just ahead of the finishing tool 25, so that the finishing tool is only required to make a fine cut, and thus a perfectly fitting, shaped end is produced on the conduit.

It is to be appreciated that the double links or parallel links 4 and 5, as shown in Figure 1, may be replaced by single links without departing from the spirit of this invention. However, the double links or parallel links are preferred, as they hold the bars 1 parallel to the shaft or clamping rod 7 in all positions of adjustment.

A further form of the invention is shown in Figures 5 and 6. In this form of the invention a driving head 34 is provided with an internally threaded aperture which receives the threaded sleeve 35. This threaded sleeve is provided with a head 36 to which links 37 are pivotally attached, such links being arranged in pairs as indicated. A clamping rod or shaft 38 slidably passes through the sleeve 35 and is provided at its rear end with a head 39 rigidly pinned to the rod 38. The head 39, similarly to the head 36, is provided with a plurality of pivotal links 40. The links 37 and 40 extend towards each other and have their outer ends pivoted to the end of clamping bars 41.

In Figure 5 the bars 41 have been shown corrugated, while in Figure 1 the bars 1 have been shown as smooth. It is clear that either construction could be followed with any form of the invention.

The rod or shaft 38 is threaded at its outer end and receives the hand nut or hand wheel 42. When the hand wheel 42 is rotated in the appropriate direction, the rod 38 is drawn forwardly and thus the mandrel is expanded and the bars 41 thereof are forced into clamping or binding engagement with the interior surface of the conduit 14.

The driving head 34 is provided with removable handles 43, see Figure 6, by means of which it may be rotated. It is also provided with slots 44 adjacent to the outer ends of its opposed arms, as shown most clearly in Figure 6, and slides 45 are received within these slots. Transverse slots 46, see Figure 5, are also provided in the head 34, and through these slots bolts 47 pass and are carried by the slides 45. It is thus clear that the slides 45 may be adjusted radially inwardly or outwardly of the head 34.

Each of the slides 45 is provided with an outwardly projecting portion 48, which is adapted to overhang the end of the conduit and to move inwardly of the conduit as the head 34 is rotated. Each of the slides 45 is provided with a cutting blade 49 which may be similar to a planer blade. These cutting blades are adjustably held by means of screws or bolts 50. They are adjusted to the exact position desired by means of the adjusting thumb screws 51, such thumb screws being provided with flanges 52 loosely fitting within slots formed in the blades 49. It is thus apparent that the screws 50 may be loosened and the thumb screws rotated to secure the exact adjustment desired for the blades 49.

In using the device the mandrel is clamped within the conduit by means of the hand wheel 42, and thus centers the entire device axially of the interior of the conduit. When the head 34 is rotated, it travels along the threaded sleeve 35, and the blades 49 trim the end of the conduit. These blades, as will be seen from Figure 5, are slanting when a slanting joint or tapered joint is desired. Obviously they may be set straight if a straight socket joint is desired, or else may be set at a very small taper or slant. It is to be noted also that these blades may be set inwardly at the same radial distance from the axis of rotation, or one of the blades may be set slightly in advance of the other if it is desired that one of the blades shall act as a roughing tool. Under these latter conditions it is preferable to form one of the members 48 in a manner to cause the roughing blade to project axially to a greater distance than the finishing blade. However, it has been found satisfactory to set both blades at the same radial distance and in the same axial position.

Two forms of joints have been shown in Figures 7 and 8.

In Figure 7 a taper joint has been shown which is ordinarily known as the Harrington joint. The adjacent ends of the conduits 14′ and 14″ are tapered and are received within the internally and reversely tapered coupling sleeve 53.

In Figure 8 a socket joint has been shown. In this joint the end of one section of conduit, as, for instance, $14_1$, is slightly cut out as indicated at 54, and the other conduit section $14_2$ has its outer surface trimmed away as indicated at 55, so that the portion 55 will socket or fit within the portion 54. Obviously the surfaces of these socketing portions may be made parallel to the axes of their respective sections, or else a slight taper may be given them.

Each form of the invention is designed to provide either type of joint by means of suitable changes as have been previously indicated.

Referring to Figure 9, it will be seen that a further form of the invention has been illustrated. In this form of the invention the same type of expanding mandrel has been shown as that illustrated in Figure 5, and it consists of the same elements and need not, therefore, be described in detail. The threaded sleeve 56, however, carries a bushing 57 and collar 58, which may be identically like the construction shown in Figure 1 and indicated by the reference characters 16 and 10 respectively. A clamping hand wheel 59, operating in identically the same manner as the hand wheel 42 of Figure 5, is employed to expand the mandrel.

If desired, any of the mandrels shown in the different forms of the invention may be provided with outwardly projecting hooked ends 60, as shown in Figure 9, which are adapted to engage the outer end of the conduit to thus definitely position the mandrel.

A driving head 61 is revolubly mounted upon the bushing 57 as previously described, and is provided with a driving or operating handle 62, which may be of the same general type previously described, or else may be a crank as shown in Figure 9. An auxiliary or feeding head 63 has its hub internally threaded and carried by the feed screw or threaded sleeve 56. The feeding head 63 is slidably received within a slide 64, which is adapted to travel outwardly upon a guide 65. The tool slide 64 is provided with an adjustably clamped tool 66, which is adapted to trim the end of the conduit when the driving head 61 is rotated. The guide 65 is carried by the driving head 61 and is locked in place by means of screws or bolts 67. It may be made adjustable with reference to the driving head if desired, as has been previously described in connection with the other forms of the invention.

In Figures 10, 11, and 12 a still further form of the invention has been shown. In this form the device is centered by means of a sleeve 68 mounted outside of the conduit 14. This sleeve is provided with a plurality of set screws 69, which are adjusted to engage and clamp the outer surface of the conduit. The sleeve 68 is externally threaded and receives the internally threaded auxiliary sleeve 70. This auxiliary sleeve 70 is attached by means of bolts 71 provided with spacers 72 to a driving head 73. This driving head is provided with handles 74 as indicated.

A tool block 75, see Figure 11, is bolted to the driving head 73, and is provided with an outwardly projecting portion 76. A cutting blade 77 is adjustably locked to the portion 76 of the tool block by means of a screw 78. It may be accurately adjusted by means of the thumb nuts 79, which are provided with flanges 80 loosely fitting within slots formed in the blade.

The blade 77 may be set either with its edge parallel to the axis of the device or at an angle to provide the requisite taper.

From actual practice it has been found that the narorw tools give the best results as they do not gum up readily. There appears to be sufficient force applied to the narrow tools, during the rotation of the head, to keep the tools clean.

It will be seen that the tools for shaping or trimming the ends of conduits are of extremely sturdy and reliable construction, and are so made that they may be readily revolved about the conduit and automatically fed, so as to produce the desired cut along the end portion of the conduits.

It will be seen also that the devices are so designed that they may be readily used in the field to quickly and accurately shape the ends of conduits when they have been cut to the desired lengths.

The conduit trimming tools are easy to make, are relatively cheap, and are of relatively simple construction.

It is also to be noted that the conduit end shaping tools may be used by unskilled labor with assurance that an accurate fit will be produced.

Although this invention has been described in considerable detail, it is to be understood that such description is intended as illustrative rather than limiting, as the invention may be variously embodied and is to be interpreted as claimed.

I claim:—

1. A device for shaping the ends of conduits comprising an expanding mandrel, adapted to be inserted within and locked to the interior portion of a conduit, a rotary head carried by said mandrel, a threaded member carried by and concentric with said mandrel, an auxiliary head carried by said threaded member and rotated around it, directly by the rotation on the mandrel of said rotary head, a guide carried around said mandrel by said rotary head, and a tool carried around said mandrel by said rotary head and moved along said guide by said auxiliary head.

2. A device for shaping the ends of conduits comprising an expanding mandrel adapted to be inserted within a conduit, said mandrel including bars and means for forcing said bars into binding engagement with the interior surface of said conduit; a threaded member rigidly carried by said mandrel; a driving head revolubly carried by said mandrel; a guide carried by said driving head; a tool-carrying slide carried by said guide; and a feeding member screwed upon said threaded member and having an arm projecting outwardly and engaging said slide.

3. A device for shaping the ends of conduits comprising an expanding mandrel adapted to be inserted within a conduit, said mandrel including bars and means for forcing said bars into binding engagement with the interior surface of said conduit; a threaded member rigidly carried by said mandrel; a driving head revolubly carried by said mandrel; a guide carried by said driving head; a tool-carrying slide adjustably carried by said guide; and a feeding member screwed upon said threaded member and having an arm projecting outwardly and slidably engaging said slide.

4. A device for shaping the ends of conduits comprising an expanding mandrel, adapted to be inserted within and locked to the interior of a conduit, a rotary head carried by said mandrel, a threaded member carried by and concentric with said mandrel, an auxiliary head carried by said threaded member and rotated around it, directly by the rotation on the mandrel of said rotary head, a tool carried around said mandrel by said rotary head and moved axially with respect to said mandrel by said auxiliary head, and means carried around said mandrel by said rotary head for guiding said tool.

In testimony whereof, the signature of the inventor is affixed hereto.

ALWIN G. STEINMAYER.